G. B. CROWE.
ORANGE OR SIMILAR FRUIT SERVING UTENSIL.
APPLICATION FILED DEC. 29, 1916.

1,236,058.  Patented Aug. 7, 1917.

Witnesses  
Philip Snell  
Frances G. Powell

Inventor  
G. B. Crowe  
By D. Swift & Co.  
her Attorneys

UNITED STATES PATENT OFFICE.

GERTRUDE B. CROWE, OF BICKLETON, WASHINGTON.

ORANGE OR SIMILAR FRUIT SERVING UTENSIL.

1,236,058.      Specification of Letters Patent.      Patented Aug. 7, 1917.

Application filed December 29, 1916. Serial No. 139,592.

*To all whom it may concern:*

Be it known that I, GERTRUDE B. CROWE, a citizen of the United States, residing at Bickleton, in the county of Klickitat, State of Washington, have invented a new and useful Orange or Similar Fruit Serving Utensil; and I do hereby declare the following to be a full, clear, and exact description of the invention, such as will enable others skilled in the art to which it appertains to make and use the same.

This invention relates to art of kitchen and table articles, and more particularly to a table article, especially adapted for facilitating the handling of such fruit as oranges, grape fruit and the like.

Usually, when eating an orange, and especially when eating a grape fruit, the same is cut in half across the axis which alines with the stem attached point of the orange or grape fruit, then the filling is cut from the walls of the two halves of the orange and from the divisional pulpy webs, thereby facilitating the removal of the filling from the pockets or cells between said webs.

Therefore, in the present invention, it is the aim to provide two semi-spherical sections, which are pivotally united, there being a semi-circular knife pivoted at the point where the two sections are united, so that by placing the orange or grape fruit between the two semi-spherical sections, the knife may be moved upon its pivot between the two sections, thereby severing the orange or grape fruit. The two semi-spherical sections then may be separated, leaving the two halves of the orange or grape fruit in their respective sections, whereby the filling may be cut from the walls of the skin and the divisional pulp webs, so that the filling may be removed and eaten while the two halves are in their respective sections.

In practical fields, the details of construction may necessitate alterations falling within the scope of what is claimed.

The invention comprises further features and combination of parts, as hereinafter set forth, shown in the drawings, and claimed.

In the drawings:—

Figures 1, 2:
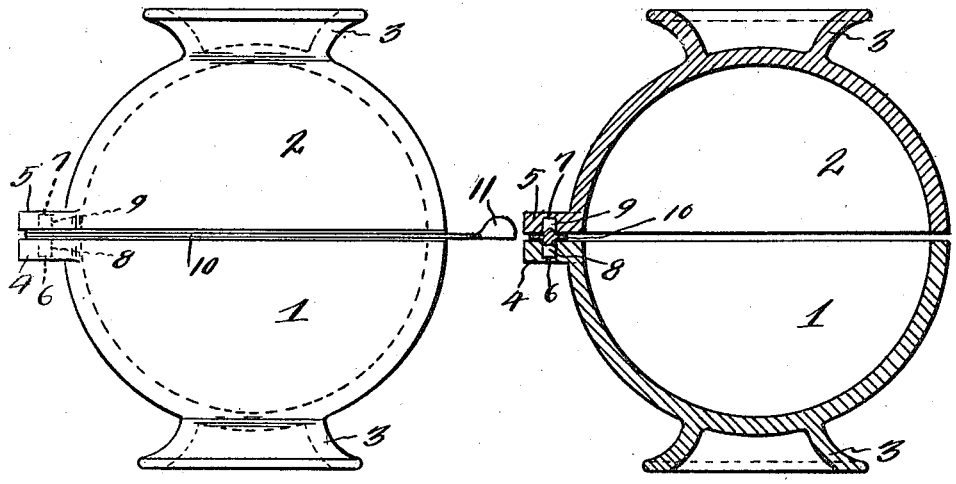
Figure 1 is a view in side elevation of the improved orange or grape fruit receptacle and cutting device, constructed in accordance with the invention.
Fig. 2 is a sectional view through the same.
Figure 3:
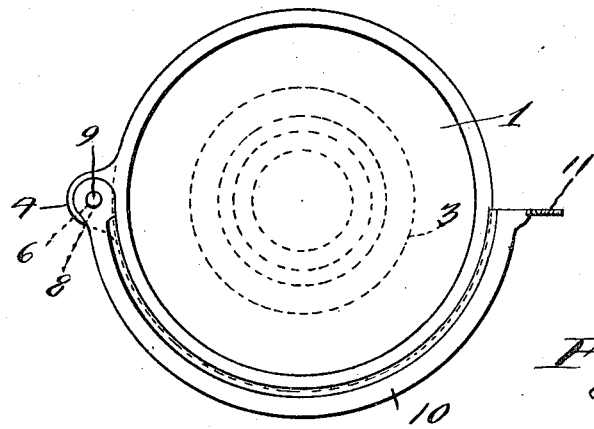
Fig. 3 is a plan view of one of the sections, showing the semi-circular knife.

Referring more especially to the drawings, 1 and 2 designate the two preferably semi-spherical sections of the orange or grape fruit holder, each of which is provided with a supporting base 3. The semi-spherical sections are provided with lateral lugs 4 and 5, the adjacent surfaces of which are provided with sockets 6 and 7, which are designed to receive the axially alined pins 8 and 9 of one end of the semi-circular knife or cutting member 10. In this manner, the two sections of the holder are pivotally united, and the knife or cutting member is pivotally mounted between the two sections, whereby when an orange or grape fruit is arranged in the holder, and the knife or cutting member is moved upon its pivot transversely of the two sections, the orange or grape fruit may be severed into halves. The two sections of the holder then may be separated, whereby the filling in the pockets between the pulp webs may be cut, so that the removal of the filling may be facilitated. The other end of the knife is provided with a handle 11, whereby the knife may be moved.

The invention having been set forth, what is claimed as new and useful, is:—

In an orange serving utensil, a pair of separable semi-spherical sections, each substantially identical in shape and height, and having their opposite spherical portions provided with diametrically opposite bases axially alined, whereby said sections, when disconnected, may be supported with their open portions flush with each other, said sections at adjacent portions having laterally extending ears, provided with axially adjoined cylindrical depressions, and a semicircular knife to move pivotally between the two sections at right angles to said bases, the pivoted end of said knife having axially alined oppositely extending lugs to detachably engage said depressions, to pivotally unite said sections detachably, whereby said knife may be held across the half of the orange in either section, when inverting the same, whereby its base may support said inverted section.

In testimony whereof I have signed my name to this specification in the presence of two subscribing witnesses.

GERTRUDE B. CROWE.

Witnesses:
DONALD LAURIE,
WILL G. FAULKNER.

Copies of this patent may be obtained for five cents each, by addressing the "Commissioner of Patents, Washington, D. C."